US011937615B2

(12) United States Patent
Ma et al.

(10) Patent No.: US 11,937,615 B2
(45) Date of Patent: Mar. 26, 2024

(54) NON-HYDROGENATED FAT COMPOSITION, USE AND PROCESS

(71) Applicant: Bunge Loders Croklaan B.V., Wormerveer (NL)

(72) Inventors: Jun Ma, Wormerveer (NL); Vincent Hubertus Cornelis De Vrind, Wormerveer (NL); Josien Mathilde Elisabeth Noppers, Wormerveer (NL); Raul-Flaviu Petrut, Wormerveer (NL); Johan Franx, Wormerveer (NL); Hans Ekkes, Wormerveer (NL)

(73) Assignee: BUNGE LODERS CROKLAAN B.V., Wormerveer (NL)

( * ) Notice: Subject to any disclaimer, the term of this patent is extended or adjusted under 35 U.S.C. 154(b) by 619 days.

(21) Appl. No.: 16/633,933

(22) PCT Filed: Jul. 25, 2018

(86) PCT No.: PCT/EP2018/070226
§ 371 (c)(1),
(2) Date: Jan. 24, 2020

(87) PCT Pub. No.: WO2019/020714
PCT Pub. Date: Jan. 31, 2019

(65) Prior Publication Data
US 2021/0145017 A1 May 20, 2021

(30) Foreign Application Priority Data

Jul. 26, 2017 (EP) ..................... 17275117

(51) Int. Cl.
| | | |
|---|---|---|
| A23D 9/04 | (2006.01) | |
| A21D 2/16 | (2006.01) | |
| A21D 13/80 | (2017.01) | |
| A23G 3/40 | (2006.01) | |

(52) U.S. Cl.
CPC ............... *A23D 9/04* (2013.01); *A21D 2/165* (2013.01); *A21D 13/80* (2017.01); *A23G 3/40* (2013.01); *A23V 2002/00* (2013.01)

(58) Field of Classification Search
CPC .......... A23D 9/04; A21D 13/80; A21D 2/165; A23G 3/40
See application file for complete search history.

(56) References Cited

U.S. PATENT DOCUMENTS

| | | | |
|---|---|---|---|
| 3,012,891 A | 12/1961 | Best et al. | |
| 6,277,433 B1 * | 8/2001 | Lantz | A21D 2/165 426/601 |
| 2010/0222607 A1 | 9/2010 | Arimoto et al. | |
| 2013/0323397 A1 | 12/2013 | Akahane et al. | |
| 2015/0264956 A1 * | 9/2015 | Miller | C11B 7/0075 426/607 |
| 2017/0107446 A1 * | 4/2017 | 'T Zand | C11B 1/025 |
| 2017/0251695 A1 | 9/2017 | Juul | |
| 2018/0177207 A1 | 6/2018 | Andersen et al. | |

FOREIGN PATENT DOCUMENTS

| | | | |
|---|---|---|---|
| CA | 2132505 A1 | 4/1995 | |
| EP | 1040761 A1 | 10/2000 | |
| EP | 2636313 A1 | 9/2013 | |
| JP | 2017-038571 A | 2/2017 | |
| WO | 2006/136536 A1 | 12/2006 | |
| WO | 2009/031680 A1 | 3/2009 | |
| WO | 2011/108919 A1 | 9/2011 | |
| WO | 2012/052471 A1 | 4/2012 | |
| WO | 2012/114914 A1 | 8/2012 | |
| WO | 2013/131862 A1 | 9/2013 | |
| WO | WO-2015150405 A1 * | 10/2015 | C11B 3/003 |
| WO | 2017/055102 A1 | 4/2017 | |

OTHER PUBLICATIONS

Gunstone et al., Extract from The Lipid Handbook, first edition (1986).
Danthine et al., "Cystallization behaviour of binary fat blends containing shea stearin as hard fat," European Journal of Lipid Science and Technology, 117: 1687-1699 (2015).
Soares et al., "Effects of chemical interesterification on physicochemical properties of blends of palm stearin and palm plein," Food Research International, 42: 1287-1294 (2009).
International Standard: Animal and vegetable fats and oils-Determination of solid fat content by pulsed NMR—(2008).
Gunstone, Extract from Vegetable Oils in Food Technology: Composition, Properties and Uses (2002).
Third Party Observations against International Patent Application No. PCT/EP2018/070226 dated Nov. 19, 2019.
Di Vincenzo et al., "Regional Variation in Shea Butter Lipid and Triterpene Composition in Four African Countries," Journal of Agriculture and Food Chemistry, 53: 7473-7479 (2005).
Notification from the International Bureau indicating a Third Party Observation filing in International Patent Application No. PCT/EP2018/070226 dated Nov. 19, 2019.

(Continued)

Primary Examiner — Stephanie A Cox
(74) Attorney, Agent, or Firm — Morgan, Lewis & Bockius LLP

(57) ABSTRACT

A non-hydrogenated fat composition comprises greater than 28% by weight stearic acid (C18:0) fatty acid residues; greater than 44% by weight oleic acid (C18:1) fatty acid residues, and less than 10% by weight of palmitic acid (C16) fatty acid residues, based on the total C8-C24 fatty acid residues, and greater than 30% by weight of the combined amounts of StOSt, StStO, StOO and OStO triglycerides based on the total glycerides present in the composition, wherein the weight ratio of (StOSt+StStO)/(StOO+OStO) is from 0.6-1.5.

14 Claims, No Drawings

(56) References Cited

OTHER PUBLICATIONS

International Search Report issued in corresponding International Patent Application No. PCT/EP2018/070226 dated Oct. 4, 2018.
Written Opinion issued in corresponding International Patent Application No. PCT/EP2018/070226 dated Oct. 4, 2018.
Third Party Observations on European Patent Application No. 18742812.3 dated Nov. 9, 2021.
Dharma R. Kodali, Extract from Trans Fats: Replacement Solutions (2014).
Q. Ashton Acton, Extract from Issues in Food Production, Processing, and Preparation (2012).
G Talbot, Extract from Specialty Oils and Fats in Food and Nutrition: Processing and Applications (2015).
Yokoseki Yushi Kogyo Co., Ltd. List of major cosmetic products, Japan, Mar. 2013.
Notice of Opposition Statement to European Patent No. EP3657954 (Application No. EP18742812.3 submitted to the European Patent Office dated Jun. 21, 2023.
Rincon-Cardona et al., "Polymorphic behavior during isothermal crystallization of high stearic high oleic sunflower oil stearins", 2013, Food Research International, vol. 51, p. 86-97.
Ahmadi et al., "Chemical and enzymatic interesterification of tristearin/triolein-rich blends: Chemical composition, solid fat content and thermal properties", 2008, Eur. J. Lipid Sci. Technol., vol. 110, p. 1014-1024.
Li et al., "Lipase-catalyzed interesterification of high oleic sunflower oil and fully hydrogenated soybean oil comparison of batch and continuous reactor for production of zero trans shortening fats", 2010, Food Science and Technology, vol. 43, p. 458-464.
Adhikari et al., "Enzymatic and Chemical Interesterification of Rice Bran Oil, Sheaolein, and Palm Stearin and Comparative Study of Their Physicochemical Properties", 2012, Journal of Food Science, vol. 77, pg. C1284-C1291.
Ahmadi et al., "Functionality and physical properties of interesterified high oleic shortening structured with stearic acid", 2009, Food Chemistry, vol. 117, p. 668-673.
Israel, "Shea Butter: An Opposite Replacement for Trans Fat in Margarin", 2015, Journal of Nutrition & Food Sciences, 5 pages total.
"Experimental report: Shea butter/olein blends", AAK, 4 pages total.
"Consistency, Penetrometer Method: Commercial Fats and Oils", 2017, American Oil Chemists Society, 4 pages total.
Experimental data from Proprietor repeating examples in the opposed patent, Loders Croklaan, 3 pages total.

* cited by examiner

NON-HYDROGENATED FAT COMPOSITION, USE AND PROCESS

The present invention relates to a non-hydrogenated fat composition, uses thereof and a process to prepare such a fat composition

BACKGROUND

Shea butter is obtained from the nuts of the shea tree (*Butyrospermum parkii*). Shea butter is used commercially as a source of StOSt (1,3-Distearoyl 2-oleoyl glyceride).). Shea butter is relatively rich in stearic and oleic acids. Shea butter may be fractionated to produce shea stearin, a higher melting fraction with potential use as a CBE, and a lower melting shea olein fraction. Shea stearin is rich in StOSt but contains other triglycerides such as StOO and StLSt (where L represents linoleic acid). The shea olein generally has a lower commercial value.

WO 2013/131862 (Loders Croklaan) describes a glyceride composition comprising triglycerides and diglycerides, obtainable from shea oil.

WO 2012/052471 (Fuji Oil) describes various lauric oil blends of oil, including compositions which may contain shea butter or shea stearin combined with oils and fats.

U.S. Pat. No. 6,277,433 (Loders Croklaan) describes fat mixtures including interesterified shea olein, used in puff pastry applications.

WO 2017/055102 (Loders Croklaan) describes a temperature tolerant fat using shea olein for confectionery applications.

DETAILED DESCRIPTION

It is an object of the invention to enable fat compositions, preferably including the shea olein fraction, that are suitable for food applications such as bakery and/or confectionery.

It is another object of the invention to provide fat compositions that have a good processability, in particular under cooled conditions.

The present invention relates to a non-hydrogenated fat composition, comprising greater than 28% by weight stearic acid (C18:0) fatty acid residues; greater than 44% by weight oleic acid (C18:1) fatty acid residues, and less than 10% by weight of palmitic acid (C16) fatty acid residues, based on the total C8-C24 fatty acid residues, and greater than 30% by weight of the combined amounts of StOSt, StStO, StOO and OStO triglycerides based on the total glycerides present in the composition, wherein the weight ratio of (StOSt+StStO)/(StOO+OStO) is from 0.6-1.5. Such compositions have a good processability and are suitable for food applications such as bakery and/or confectionery. The fat compositions are for instance obtainable from shea butter or fractions thereof, preferably blends of shea butter and shea olein.

The term "non-hydrogenated" has its usual meaning in the art that the fat composition, or any of its component fats, has not been subjected to a step of hydrogenation. Typically, non-hydrogenated means that the fat composition comprises less than 1%, more preferably less than 0.5%, by weight of trans fatty acids based on the total C8-C24 fatty acid residues.

The term fatty acid, as used herein, refers to straight chain saturated or unsaturated (including mono-, di- and poly-unsaturated) carboxylic acids having from 8 to 24 carbon atoms. Fatty acid residues may be determined by GC-FAME (fatty acid methyl ester) according to ISO 12966-2 and ISO 12966-4. Triglyceride compositions may be determined by GC (ISO 23275). The analysis includes triglycerides such as StOO, StOSt and StStSt, wherein St is a stearic acid residue and O is an oleic acid residue.

Preferably, the fat composition has a solid fat content (SFC) with an N10 of less than 40 in the stabilized fat. N10 is the SFC at 10° C. as measured using NMR on the stabilized fat according to ISO 8292-1. Such fats show a good processability, in particular when the fat composition is taken out of a cooled storage which would typically be at a temperature of 8° C. or below. More preferably, the fat composition has an N10 of 25-40, an N20 of less than 35, an N30 of less than 15, an N35 of less than 10 and an N40 of less than 8.

In a preferred embodiment, the composition comprises a blend of shea butter and shea olein or an interesterified blend of shea butter and shea olein. Preferably, the blend consists of shea butter and shea olein in a weight ratio of from 10:90 to 90:10, more preferably from 20:80 to 80:20. Other fat fractions may be blended with such a blend, and also additives such as emulsifiers may be added, depending on the application.

In yet another preferred embodiment, the composition is free or essentially free of fatty acid residues from palm oil or palm oil fractions. By essentially free it is meant that the composition contains less than 1% by weight of fatty acid residues from palm oil or palm oil fractions.

It is preferred that the weight ratio (StOSt+StStO)/(StOO+OStO) is from 0.7-1.2.

In a preferred embodiment, the composition comprises less than 10%, preferably less than 5%, by weight of C12 fatty acid residues, based on the total C8-C24 fatty acid residues. Lauric fatty acid residues are undesirable in certain applications, in particular there may be incompatibility with cocoa butter.

Preferably, the stearic acid to palmitic acid weight ratio is greater than 2.5, more preferably greater than 4.

The invention also relates to the use of a composition according to the invention for a bakery application.

In a preferred embodiment, the bakery application is as a shortening. A shortening is a product consisting of 100% fat, which is plasticized, usually by votation means, for use in different bakery applications such as puff pastries, cakes and/cookies as a dough or lamination fat.

Bakery compositions comprising a fat composition of the invention typically also comprise flour and optionally water.

In another preferred embodiment, the bakery application is puff pastry. Such fat compositions have specific properties appreciated in puff pastry applications, in particular a processabilty that allows for applying the fat in thin layers with dough. Making puff pastry products typically involves repeatedly rolling and folding a shortening into a dough, resulting in alternate layers of fat and dough. When such a puff pastry layered material is baked, this results in a baked product with significant gaseous pockets, called 'puff'.

The invention further relates to the use of a triglyceride composition according to any of the preceding claims for a confectionery application, in particular a confectionery filling fat. Confectionery compositions containing a composition of the invention typically also comprise sugar and may further comprise cocoa powder.

The invention also relates to a process for the preparation of a triglyceride composition, comprising the blending of shea butter and shea olein in a weight ratio of from 10:90 to 90:10, preferably from 20:80 to 80:20. The non-interesterified blends are particularly suitable for application in confectionery, in particular as filling fats.

In a preferred embodiment, the shea olein is interesterified shea olein.

In another preferred embodiment, in the process after blending, the shea butter and the shea olein are chemically or enzymatically interesterified. The interesterified blends are particularly suitable for applications in puff pastry applications.

The invention will now be further elucidated by the following non-limiting examples.

Example 1: Shea Olein/Shea Butter Blends

Typical compositions of shea butter and interesterified shea olein as used herein are shown below.

|  | Refined shea butter | Refined interesterified shea olein |
|---|---|---|
| IVFAME | 48 | 60.5 |
| FFA% | 0.08 | 0.05 |
| C8:0 | 0 | 0.1 |
| C10:0 | 0 | 0 |
| C12:0 | 0.4 | 1 |
| C14:0 | 0.2 | 0.5 |
| C16:0 | 3.9 | 7.8 |
| C18:0 | 44.2 | 27.3 |
| C18:1 | 43.2 | 52.9 |
| C18:2 | 5.8 | 8 |
| C18:3 | 0.2 | 0.3 |
| Total Trans | 0.2 | 0.4 |
| C20:0 | 1.5 | 1.1 |
| SAFA | 50.5 | 38.1 |
| PPSt + PStP | 0.1 | 0.4 |
| PStSt + StPSt | 0.2 | 1.4 |
| POSt + PStO + OPSt | 5.1 | 5.7 |
| StStSt | 1.3 | 2.4 |
| StOSt + StStO | 41.7 | 15.6 |
| StOO + OStO | 25.7 | 26.1 |
| StLSt + StStL | 4.5 | 0 |
| OOO | 4.6 | 16.9 |
| AStSt + StASt | 0.1 | 0.3 |
| AOSt + AStO + OASt | 2 | 1 |

In the above table:

Cx:y refers to a fatty acid having x carbon atoms and y double bonds; levels determined by GC-FAME (ISO 12966-2 and ISO 12966-4)

IVFAME refers to calculated iodine value;

FFA refers to the amount of free fatty acids;

Trans refers to trans fatty acids;

SAFA refers to saturated fatty acids;

O, P, St, L and A refer to oleic, palmitic, stearic, linoleic and arachidic acids, respectively;

Triglyceride compositions: POSt, and other triglycerides were determined by GC (ISO 23275), wherein each GC peak includes triglycerides having the same fatty acids in different positions e.g., POSt is in the same signal peak as PStO and StPO.

Chemically interesterified Shea olein was blended with Shea butter by using two different ratios: 80/20 (w/w) and 60/40 (w/w). The fat compositions were obtained from the blends after bleaching and deodorization. As a reference fat for the confectionery application trials, the commercially available fat Biscuitine 300 was used, as obtained from 101 Loders Croklaan BV, The Netherlands. As a reference fat for the bakery application trials, a fat blend of palm oil and palm stearin (IV~35) with a ratio 50/50 (w/w) was used. The analytical results of the reference fats and the inventive fat compositions are shown in Table 1.

TABLE 1

Fat compositions 80/20 interesterified shea olein/shea butter, Biscuitine 300, 60/40 interesterified shea olein/shea butter and 50/50 palm oil/palm stearin.

|  | Example 1.1 interesterified shea olein/shea butter 80/20 | Reference 1.1 Biscuitine 300 | Example 1.2 interesterified shea olein/shea butter 60/40 | Reference 1.2 palm oil/palm stearin 50/50 |
|---|---|---|---|---|
| IVFAME | 58.2 | 47.1 | 55.4 | 43.5 |
| SAFA | 40.3 | 53.8 | 43.1 | 57.7 |
| C8:0 | 0 | 0 | 0 | 0 |
| C10:0 | 0.1 | 0 | 0 | 0 |
| C12:0 | 0.7 | 0.3 | 0.6 | 0.3 |
| C14:0 | 0.4 | 1.2 | 0.3 | 1.1 |
| C16:0 | 7.1 | 46.5 | 6.8 | 50.8 |
| C18:0 | 30.5 | 5.1 | 33.7 | 4.8 |
| C18:1 | 51.5 | 37.4 | 48.8 | 33.9 |
| C18:2 | 7.5 | 8.2 | 7.2 | 7.8 |
| C18:3 | 0.2 | 0.2 | 0.2 | 0.2 |
| Total Trans | 0.5 | 0.1 | 0.3 | 0.2 |
| C20:0 | 1.2 | 0.4 | 1.3 | 0.4 |
| POP + PPO | 2.5 | 34.5 | 2.4 | 28.3 |
| PPSt + PStP | 0.6 | 2.3 | 0.6 | 3.3 |
| PStSt + StPSt | 1.1 | 0.4 | 1.1 | 0.4 |
| POSt + PStO + OPSt | 5.4 | 5.9 | 5.7 | 4.6 |
| StStSt | 2.2 | 0 | 2.1 | 0.1 |
| StOSt + StStO | 20.1 | 0.7 | 25.4 | 0.7 |
| StOO + OStO | 25.7 | 2 | 25.5 | 1.9 |
| StLSt + LStSt | 1.2 | 0.1 | 2.6 | 0 |
| OOO | 14 | 2.9 | 10.6 | 2.8 |
| AStSt + StASt | 0.3 | 0 | 0.3 | 0 |
| AOSt + AStO + OASt | 1.3 | 0 | 1.5 | 0.1 |
| (StStO + StOSt)/(StOO + OStO) | 0.78 | 0.35 | 1 | 0.37 |

TABLE 1-continued

Fat compositions 80/20 interesterified shea olein/shea butter, Biscuitine 300, 60/40 interesterified shea olein/shea butter and 50/50 palm oil/palm stearin.

|  | Example 1.1 interesterified shea olein/shea butter 80/20 | Reference 1.1 Biscuitine 300 | Example 1.2 interesterified shea olein/shea butter 60/40 | Reference 1.2 palm oil/palm stearin 50/50 |
|---|---|---|---|---|
| S20-N10 | 30 | 56 | 36 | 59 |
| S20-N20 | 25 | 38 | 31 | 48 |
| S20-N30 | 10 | 16 | 12 | 30 |
| S20-N35 | 5 | 8 | 6 | 23 |
| S20-N40 | 3 | 3 | 3 | 18 |

In the above table:
Cx:y refers to a fatty acid having x carbon atoms and y double bonds; levels determined by GC-FAME (ISO 12966-2 and ISO 12966-4)
IVFAME refers to calculated iodine value;
SAFA refers to saturated fatty acids;
Trans refers to trans fatty acids;
O, P, St, L and A refer to oleic, palmitic, stearic, linoleic and arachidic acids, respectively;
Triglyceride compositions: POSt, and other triglycerides were determined by GC (ISO 23275),
wherein each GC peak includes triglycerides having the same fatty acids in different positions e.g.,
POSt is in the same signal peak as PStO and StPO.
S20-Nx refers to solid fat content determined by NMR on 20° C. stabilized fat at x° C. (ISO 8292-1);

Example 2 Interesterified Shea Olein/Shea Butter Blend 200 kg of a blend of 60% by weight Shea olein and 40% by weight of Shea butter was chemically interesterified using sodium methoxide followed by bleaching and deodorization. This fat is referred to as Example 1.3. The fat composition has the following composition (Table 2):

TABLE 2

| Fat Composition interesterified 60/40 shea olein/shea butter | |
|---|---|
| IVFAME | 57.6 |
| SAFA | 42.3 |
| C8:0 | 0 |
| C10:0 | 0 |
| C12:0 | 0.4 |
| C14:0 | 0.3 |
| C16:0 | 8.5 |
| C18:0 | 31.6 |
| C18:1 | 48.6 |
| C18:2 | 7.9 |
| C18:3 | 0.6 |
| Total Trans | 0.3 |
| C20:0 | 1.2 |
| POP + PPO | 1.6 |
| PPSt + PStP | 1.1 |
| PStSt + StPSt | 3.6 |
| POSt + PStO + OPSt | 8.6 |
| StStSt | 3.7 |
| StOSt + STStO | 16.8 |
| StOO + OStO | 21.9 |
| StLSt + StStL | 1.6 |
| OOO | 11.8 |
| AStSt + StASt | 0.5 |
| AOSt + AStO+OASt | 1.3 |
| (StOSt + StStO)/(StOO + OStO) | 0.77 |
| S20-N10 | 30 |
| S20-N20 | 25 |
| S20-N30 | 13 |
| S20-N35 | 8 |
| S20-N40 | 5 |

In the above table:
Cx:y refers to a fatty acid having x carbon atoms and y double bonds; levels determined by GC-FAME (ISO 12966-2 and ISO 12966-4)
IVFAME refers to calculated iodine value;
SAFA refers to saturated fatty acids;
Trans refers to trans fatty acids;
O, P, St, L and A refer to oleic, palmitic, stearic, linoleic and arachidic acids, respectively;
Triglyceride compositions: POSt, and other triglycerides were determined by GC (ISO 23275), wherein each GC peak includes triglycerides having the same fatty acids in different positions e.g., POSt is in the same signal peak as PStO and StPO.
S20-Nx refers to solid fat content determined by NMR on 20° C. stabilized fat measured at x° C. (ISO 8292-1).

Example 3: Confectionery Fillings

A cocoa-containing confectionery filling was prepared by mixing the following ingredients in Table 3 using a ball mill at 240 rpm for 40 minutes. Fat blend 1.1 was used. For a reference filling fat, the fat blend was replaced by a standard filling fat, Biscuitine 300 obtained from Loders Croklaan BV, Wormerveer, The Netherlands.

TABLE 3

| Cocoa filling recipe | |
|---|---|
| Ingredients | % |
| Fat blend | 40 |
| Sugar | 45 |
| Cocoa powder 10/12 alkalized | 10 |
| Skimmed milk powder | 5 |
| Lecithin | 0.4 |
| Vanillin | 0.02 |
| Total fat phase | 40 |

A confectionery filling with hazelnut was prepared by mixing the following ingredients using a ball mill at 240 rpm for 40 minutes. Fat blend 1.1 is used. For a reference filling fat, the fat blend was replaced by a standard filling fat, Biscuitine 300 obtained from Loders Croklaan BV, Wormerveer, The Netherlands.

TABLE 4

Hazelnut filling recipe

| Ingredients | % |
|---|---|
| Fat blend | 30 |
| Sugar | 39 |
| Hazelnut paste | 16 |
| Full cream milk powder | 10 |
| Cocoa powder 10/12 alkalized | 5 |
| Lecithin | 0.2 |
| Vanilla flavor | 0.02 |
| Total fat phase | 42 |

The confectionery fillings are summarized in table 5.

TABLE 5

Confectionery fillings according to recipes as described above:

| Cocoa Filling | Fat Blend |
|---|---|
| 1 | Example 1.1 |
| 2 | Reference 1.1 |
| Hazelnut Filling | |
| 3 | Example 1.1 |
| 4 | Reference 1.1 |

Example 4: Storage Trials

The confectionery fillings prepared according to Example 3 were deposited (at 23-26° C. for Example 1.1 and at 30-33° C. for the Reference 1.1) into dark chocolate shells and cooled in a static cooling cabinet (12° C.) for at least 15 minutes. After the initial cooling, the chocolate shells were bottomed with dark chocolate and cooled in a static cooling cabinet (12° C.) for at least 15 minutes. The chocolate shells containing the fillings were then stored at different temperatures for further evaluation. The chocolate shells were stored at 20° C., 25° C. as well as under temperature cycling conditions between 15° C. for 12 hours and 25° C. for 12 hours.

The appearance was assessed after 1 day, 2 weeks, 1 month and 3 months as shown in the following tables. Appearance was evaluated for gloss and blooming.

Gloss and Bloom

Gloss is indicated by a gloss factor ranging from 1-5, wherein 1 is matte (no gloss) and 5 is very glossy. Bloom is indicated by a bloom factor ranging from A-C, wherein A is no bloom and C is heavily bloomed. Results are shown in Tables 6a, 6b, 6c and 6d.

TABLE 6a

Gloss and boom after one day

| Sample | Fat Blend | 20° C. | 25° C. | 15/25° C. |
|---|---|---|---|---|
| 1 | Example 1.1 | 5A | 5A | 5A |
| 2 | Reference 1.1 | 5A | 5A | 5A |
| 3 | Example 1.1 | 5A | 5A | 5A |
| 4 | Reference 1.1 | 5A | 5A | 5A |

TABLE 6b

Gloss and bloom after two weeks

| Sample | Fat Blend | 20° C. | 25° C. | 15/25° C. |
|---|---|---|---|---|
| 1 | Example 1.1 | 5A | 5B | 4A |
| 2 | Reference 1.1 | 5A | 1C | 4A |
| 3 | Example 1.1 | 5A | 5B | 4A |
| 4 | Reference 1.1 | 5A | 3C | 4A |

TABLE 6c

Gloss and bloom after 1 month

| Sample | Fat Blend | 20° C. | 25° C. | 15/25° C. |
|---|---|---|---|---|
| 1 | Example 1.1 | 5A | 4B | 3A |
| 2 | Reference 1.1 | 4B | 1C | 3B |
| 3 | Example 1.1 | 5A | 5B | 4A |
| 4 | Reference 1.1 | 5B | 1C | 4B |

TABLE 6d

Gloss and bloom after three months

| Sample | Fat Blend | 20° C. | 25° C. | 15/25° C. |
|---|---|---|---|---|
| 1 | Example 1.1 | 5A | 4B | 2B |
| 2 | Reference 1.1 | 1C | 1C | 1C |
| 3 | Example 1.1 | 5B | 4B | 3B |
| 4 | Reference 1.1 | 2C | 1C | 2C |

Example 5: Application of Fat Blends in Puff-Pastry 5.1 Shortening Preparation Shortenings were produced using Example 1.2 and Reference 1.2. The shortenings did not contain emulsifiers, dyes, flavor or any other additives.

The Example 1.2 shortening was produced at pilot scale with a votation equipment having an A-C-A-B configuration with a 30% throughput. In this set-up the A-unit represents a scraped surface heat exchanger, the B-unit represents the resting tube and C-unit stands for a pin-rotor machine as known in the art. The fat was melted and equilibrated at a temperature equal to the melting point+10° C. The first A-unit was set at 1,000 rpm, the second A-unit at 150 rpm, while the C-unit was set at 20 rpm. The product temperature measured 41.8° C. after the first A-unit, 34.5° C. after the C-unit. The shortening was packed under ambient conditions. Further on the shortening was tempered for 24 h at 18° C. and stored at 22° C. afterwards.

Plastic shortenings were obtained, suitable to be used as lamination fats over a wide range of temperatures. The shortening produced with Example 1.2 showed no post-hardening over the investigated two months, with a constant hardness (cone penetration method, 45°, texture analyzer) of 117±8 g.

5.2 Preparation of Puff-Pastry Products

The obtained shortenings were used in the preparation of puff-pastries as follows:

TABLE 7

Puff-pastry recipe

| Dough ingredients | Quantity [g] |
|---|---|
| Flour | 500 |
| Water | 275 |
| Reference 1.2/Example 1.2 | 60 |
| Salt | 5 |
| Lamination fat | |
| Reference 1.2/Example 1.2 | 240 |

The dough was prepared and slowly kneaded with a spiral dough kneader for 8 min. Afterwards the dough was left to rest for 10 min at ambient temperature (20° C.). The lamination was conducted in two steps, ½ French (3-folding) and ½ Dutch (4-folding) in the first step. The dough was left to rest for 30 min at 4° C., after which the first lamination step was repeated and the dough subjected to another resting of 30 min. The thickness of the final laminated dough measured 10 mm. From this dough squared puff pastries were cut with a 93×93 mm stainless steel dough cutter. The puff pastries were baked in a conventional baking oven at 190° C. for 20 min. The shortening produced with Example 1.2 showed superior plasticity and handling during lamination.

Compared to the reference shortening, the puff pastry baked with Example 1.2 shortening possesses enhanced properties:

Superior height (Reference: 47.5 mm; Blend 1: 59.2 mm)
Improved texture (better layer distinction)
Consumer acceptance test: Excellent appearance and overall impression Example 6: Multi-Purpose Shortening From the Example 1.3 a shortening was developed. The shortening did not contain emulsifiers, dyes, flavors or any other additives.

The Example 1.3 shortening was produced at pilot scale through a votation set consisting of one A-unit, one B-unit and one C-unit. The throughput of the system was set at 40%, while the cooling was set at −20° C. The fat was melted and equilibrated at 50° C. The A-unit was set at 1000 rpm, while the C-unit was set at 140 rpm. The product temperature at the exit from the resting tube measured ~15° C. The shortening was packed under ambient conditions. Further on the shortening was tempered for 24 h at 18° C. and stored at 22° C. afterwards.

A plastic shortening was obtained, suitable to be used as a lamination fat over a wide range of temperatures and applications. The shortening was observed to be plastic enough to withstand multiple lamination steps (i.e. sheeting), without rupturing or being absorbed in the dough.

The invention claimed is:

1. A non-hydrogenated fat composition, comprising:
    greater than 28% by weight stearic acid (C18:0) fatty acid residues;
    greater than 44% by weight oleic acid (C18:1) fatty acid residues, and
    less than 10% by weight of palmitic acid (C16) fatty acid residues,
based on the total C8-C24 fatty acid residues, and greater than 30% by weight of the combined amounts of StOSt, StStO, StOO and OStO triglycerides based on the total glycerides present in the composition,
wherein the weight ratio of (StOSt+StStO)/(StOO+OStO) is from 0.6-1.5 and the composition comprises an interesterified blend of shea butter and shea olein.

2. The fat composition according to claim 1, wherein the fat composition has a solid fat content (SFC) with an N10 of less than 40, measured on the stabilized fat according to ISO 8292-1.

3. The fat composition according to claim 2, wherein the fat composition has an N10 of 25-40, an N20 of less than 35, an N30 of less than 15, an N35 of less than 10 and an N40 of less than 8.

4. The fat composition according to claim 1, wherein the composition is free or essentially free of fatty acid residues from palm oil or palm oil fractions.

5. The fat composition according to claim 1, wherein the weight ratio (StOSt+StStO)/(StOO+OStO) is from 0.7-1.2.

6. The fat composition according to claim 1, wherein the composition comprises less than 10%, by weight of C12 fatty acid residues, based on the total C8-C24 fatty acid residues.

7. The fat composition according to claim 1, wherein the stearic acid to palmitic acid weight ratio is greater than 2.5.

8. The fat composition according to claim 1, wherein the blend consists of shea butter and shea olein in a weight ratio of from 10:90 to 90:10.

9. The fat composition according to claim 1, wherein the blend consists of shea butter and shea olein in a weight ratio of from 20:80 to 80:20.

10. A bakery application comprising the fat composition of claim 1.

11. The bakery application according to claim 10, wherein the bakery application is a shortening.

12. The bakery application according to claim 10, wherein the bakery application is puff pastry.

13. A confectionery application comprising the fat composition of claim 1.

14. The confectionery application according to claim 13, where the confectionery application is a confectionery filling fat.

\* \* \* \* \*